(12) United States Patent
Jolivet

(10) Patent No.: US 8,670,712 B2
(45) Date of Patent: Mar. 11, 2014

(54) MOBILE TERMINAL AND METHOD FOR PROVIDING ENHANCED CONTACTLESS COMMUNICATION USING CONTACTLESS MODULE

(75) Inventor: Paul Jolivet, Paris (FR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 13/132,804

(22) PCT Filed: Dec. 8, 2009

(86) PCT No.: PCT/KR2009/007311
§ 371 (c)(1),
(2), (4) Date: Jun. 3, 2011

(87) PCT Pub. No.: WO2010/068016
PCT Pub. Date: Jun. 17, 2010

(65) Prior Publication Data
US 2011/0237190 A1 Sep. 29, 2011

Related U.S. Application Data

(60) Provisional application No. 61/122,397, filed on Dec. 14, 2008.

(51) Int. Cl.
*H04B 1/00* (2006.01)
(52) U.S. Cl.
USPC ....... 455/41.2; 455/574; 455/575.7; 455/41.1
(58) Field of Classification Search
USPC ........... 340/572.7; 455/41.2, 41.1, 41.3, 574, 455/575.7
See application file for complete search history.

(56) References Cited

U.S. PATENT DOCUMENTS

| 7,453,363 B2 * | 11/2008 | Reynolds ................... 340/572.7 |
| 7,541,930 B2 * | 6/2009 | Saarisalo et al. ........... 340/572.7 |
| 7,596,356 B2 * | 9/2009 | Rofougaran et al. ........... 455/73 |
| 2003/0058174 A1 | 3/2003 | Sung |

FOREIGN PATENT DOCUMENTS

| KR | 10-2006-0001210 | * | 1/2006 |
| KR | 10-2006-0001210 A | | 1/2006 |
| KR | 10-2007-0071669 | * | 7/2007 |
| KR | 10-2007-0071669 A | | 7/2007 |

* cited by examiner

*Primary Examiner* — Lewis West
(74) *Attorney, Agent, or Firm* — Birch, Stewart, Kolasch & Birch, LLP

(57) ABSTRACT

A method and mobile terminal for enhanced contactless communication are discussed. According to an embodiment, the invention provides a mobile terminal comprising: a plurality of antennas designated for a contactless reception/transmission of signals from/to an external device, each of the plurality of antennas configured to receive a signal provided from the external device; and a contactless module operatively coupled to the plurality of antennas, and including a controller, the controller configured to check a strength of the signal received from each of the plurality of antennas, to select one of the plurality of antennas based on the checked result, and to receive the signal continuously or a new signal using the selected antenna.

12 Claims, 4 Drawing Sheets

MOBILE TERMINAL AND METHOD FOR PROVIDING ENHANCED CONTACTLESS COMMUNICATION USING CONTACTLESS MODULE

This application is the National Phase of PCT/KR2009/007311 filed on Dec. 8, 2009, which claims the benefit under 35 U.S.C. 119(e) of U.S. Provisional Application No. 61/122,397 filed on Dec. 14, 2008, all of which are hereby expressly incorporated by reference into the present application.

TECHNICAL FIELD

The present invention relates to a method and device for providing enhanced contactless communication using a contactless module.

BACKGROUND ART

Mobile terminals such as smart phones, etc. are being developed with the increased capabilities for providing various services and functionalities which are user-friendly. Among the capabilities, the mobile terminal may include a contactless module/interface and a removable storage device such as a smart card (e.g., a SIM (Subscriber Identity Module) card or USIM (Universal Subscriber Identity Module) card) therein, which can be read contactless by a contactless reader. For instance, the smart card may store therein transportation fares and passes, which can be read by metro or train gateways. The smart cards generally use a UICC platform that supports telecommunication applications.

However, the contactless module residing in the mobile terminal according to the related art has a single antenna designated for the contactless communication. Due to this configuration and the location of the antenna, sometimes the contactless communication between the contactless module of the mobile terminal and an external device such as a contactless reader/module may have problems or may not be reliable. This is not desirable and causes inconvenience to the users/operators of the mobile terminal and external device.

DISCLOSURE OF INVENTION

Solution to Problem

The present invention provides a mobile terminal and method for providing enhanced contactless communication using a contactless module, which address the limitations and disadvantages associated with the related art.

The present invention provides a mobile terminal or the like including a contactless module having a plurality of antennas designated for contactless communication, and methods of using such contactless module in enhanced ways.

According to one aspect, the present invention provides a mobile terminal comprising: a plurality of antennas designated for a contactless reception/transmission of signals from/to an external device, each of the plurality of antennas configured to receive a signal provided from the external device; and a contactless module operatively coupled to the plurality of antennas, and including a controller, the controller configured to check a strength of the signal received from each of the plurality of antennas, to select one of the plurality of antennas based on the checked result, and to receive the signal continuously or a new signal using the selected antenna.

According to another aspect, the present invention provides a method for providing contactless communication using a mobile terminal, the mobile terminal including a plurality of antennas designated for a contactless reception/transmission of signals from/to an external device, and a contactless module operatively coupled to the plurality of antennas and including a controller, the method comprising: receiving, by each of the plurality of antennas, a signal provided from the external device; checking, by the controller, a strength of the signal received from each of the plurality of antennas; selecting, by the controller, one of the plurality of antennas based on the checking result; and receiving the signal continuously or a new signal using the selected antenna.

These and other features of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention and wherein.

MODE FOR THE INVENTION

Hereinafter, exemplary embodiments of the invention will be described in detail with reference to the attached drawings. The embodiments described below are intended to exemplify the technical spirit of the invention, but are not intended to limit the scope of the invention.

Figure 1:
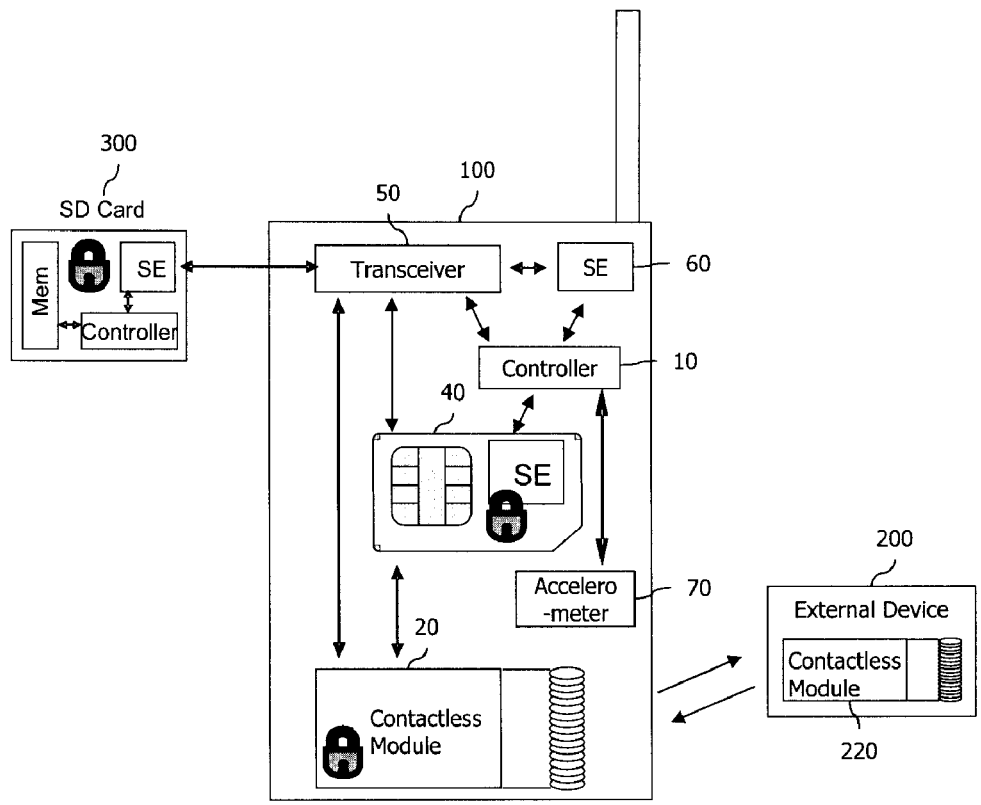
FIG. 1 is a block diagram of a mobile terminal configured to communicate contactlessly with an external device according to an embodiment of the invention.

FIG. 1 is a block diagram of a mobile terminal 100 configured to communicate contactlessly with an external device 200 according to an embodiment of the invention. The mobile terminal 100 may be, e.g., a smart phone, pager, PDA (Personal Digital Assistant), UE (user equipment), mobile phone, etc. The external device 200 may be a non-portable or portable device such as a mobile device, mobile station, desktop, work station, computer notebook, computer tablet, computer station, etc. In other examples, each of the mobile terminal and the external device can be any communication device capable of contactless communication with each other or with other devices.

Referring to FIG. 1, the mobile terminal 100 includes a controller 10, a contactless module 20, a removable storage device 40 (e.g., smart card, SIM card, USIM card, ISIM card, etc.), a transceiver 50 for receiving and/or transmitting signals, a secure element 60 which provides added security to data and applications related to contactless services (e.g., via encryption/decryption or other security enhancing applications), an accelerometer 70 for detecting the movement/position of the mobile terminal 100, etc. The secure element 60 can be part of the storage device 40 and can be implemented using UICC (smart card platform). The secure element 60 can also be based on a secured hardware part of the mobile terminal 100 or on any secure removable part such as a SD card 300. The contactless module 20 (e.g., Contactless Function (CLF) module or NFC module) can communicate (e.g., send and receive) contactlessly (e.g., via electronic magnetic fields) with contactless modules in external devices. The controller 10 controls all components of the mobile terminal 100.

The contactless module 20 preferably includes a contactless reader such that the contactless module 20 can send and receive data contactlessly to and from another component or external device 200 having a contactless module 220. That is, the contactless module 20 communicates contactlessly with the contactless module 220 in the external device 200 (shown only as an example of an external device) to receive, send, execute, and/or verify data, applications, signals, etc. The contactless module 20 can be integrated into the mobile terminal 100 or can be in a device separately connected to the mobile terminal 100. The contactless module 20 can include a tag which can have a chip, but can be in other form. Various types of contactless technologies are known and can be used in the contactless module 20.

The mobile terminal 100 can further include known components such as a battery, a power management unit for supplying power (AC, battery, etc.), local communication device(s), a display unit, a speaker, an input unit, storage unit(s), a network interface (e.g., for communicating with a server or other network entity), etc. The local communication device can be a short range communication unit such as a Bluetooth device, a WiFi device, an IRDA (infrared data association) device, etc. for providing short distance communications between the mobile terminal 100 with other device(s). A removable storage device 300 such as a SD card can also be inserted in the mobile terminal 100 or provided to communicate with the mobile terminal 100. Such storage device 300 may include known components such as a memory, a secure element, a controller for controlling the storage device 300, etc.

All the components of the mobile terminal 100 and other devices of FIG. 1 are operatively coupled and configured. Further, depending on the desired need and configuration, some of the components of the mobile terminal 100 may be optionally provided. For example, the accelerometer 70 may be optionally provided.

Figure 2:
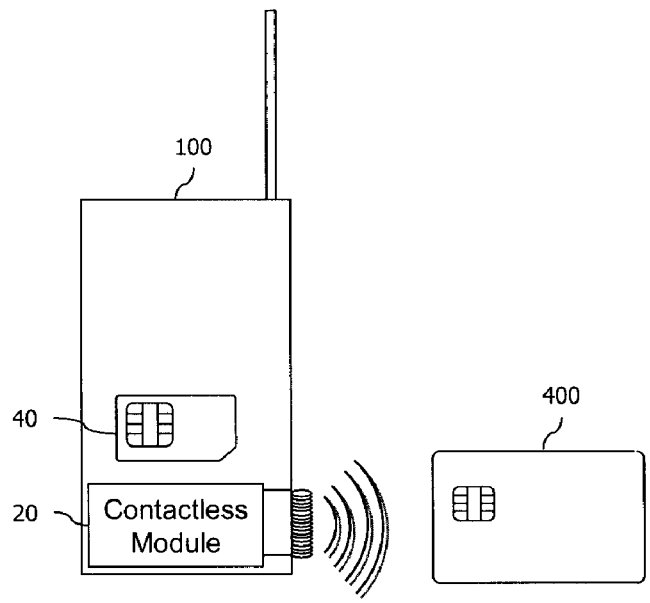
FIGS. 2, 3 and 4 are diagram illustrating respectively an example of a reader mode, a card emulation mode, and a peer to peer mode of the contactless module of the mobile terminal according to an embodiment of the invention.
Figure 3:
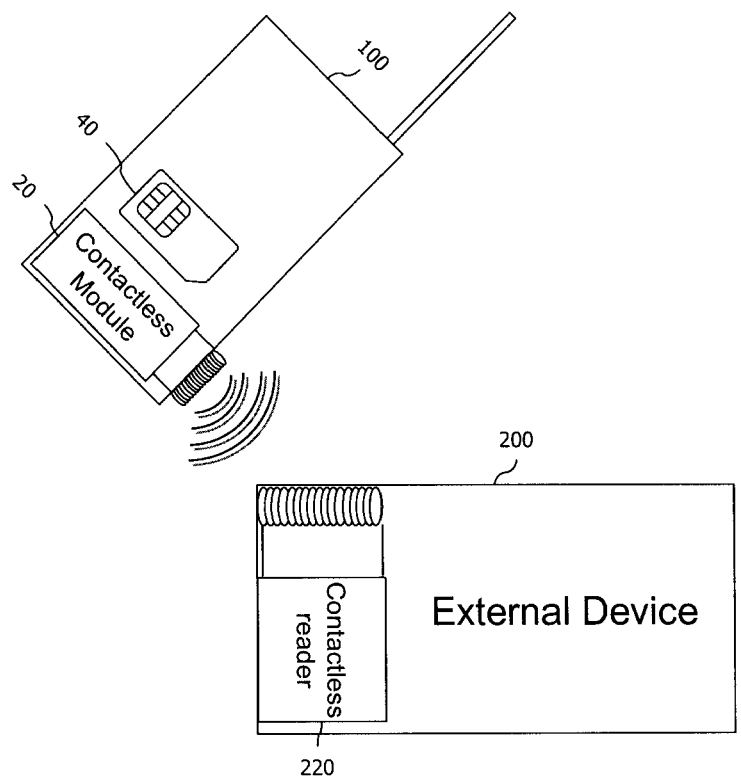
Figure 4:
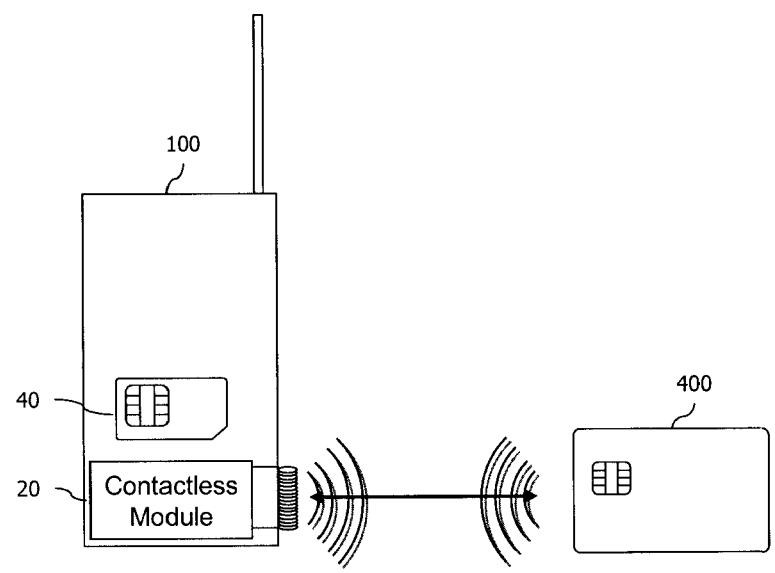

When using the contactless module 20, it can operate in various modes. For instance, the contactless module 20 may operate in one of the following modes:
  Reader mode as shown in one example of FIG. 2: initiates transactions (e.g., banking, point of sales, etc.) and reading operations with another device such as a smart card 400, a tag displayed in a movie theater which allows communication with a server, etc.;
  Card Emulation mode in one example of FIG. 3: answers to a contactless reader (e.g., operating in the reader mode) of another device (e.g., the contactless reader/module 220 of the external device 200) where the applications in the storage device 40 can process information, manage credits, tickets, sales, etc. and even in some cases, the contactless module 20 can be powered by the contactless reader 220; and
  Peer to Peer mode (intermediate mode that is made of a combination of the above two modes) in one example of FIG. 4: during a transaction, communication can be turned on so that the contactless module 20 can move from the reader mode (e.g., to read data from the storage device 400) to the card emulation mode, or vice versa, to enable a proactive communication.

Further, when the mobile terminal 100 is in the normal mode where it is powered by the battery, then the contactless module 20 and the removable storage device 40 of the mobile terminal 100 can be powered by the battery therein. As such, the contactless module 20 of the mobile terminal 100 can access data from or communicate with the removable storage device or any other terminal resources (e.g., display device, other storage device such an internal memory of the terminal).

On the other hand, if the battery is empty or the mobile terminal 100 is turned off, then limited services may be available by the mobile terminal. In that case, the contactless module 20 of the mobile terminal 100 may be powered contactlessly by a reader (e.g., 220 in the external device 200) that wishes to access data from the mobile terminal 100. For instance, the contactless reader/module 220 of the external device 200 may generate electromagnetic fields and thereby power the contactless module 20 of the mobile terminal 100, which in turn can power the removable storage device(s) 40, 300. Then the contactless reader 220 can access data from the removable storage device(s) 40, 300 through the contactless module 20 of the mobile terminal 100.

Figure 5:
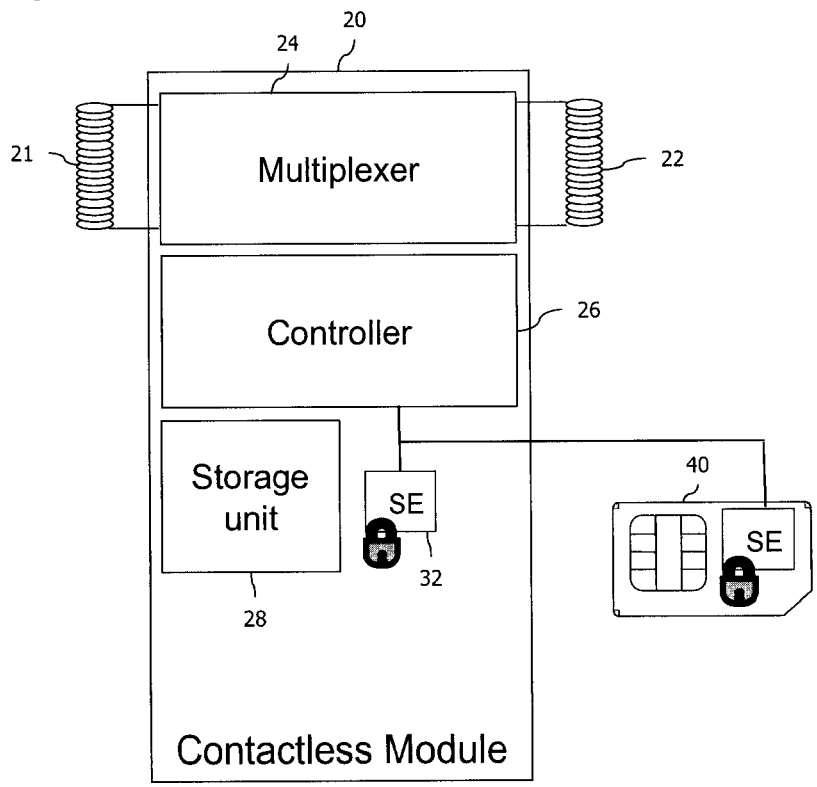
FIG. 5 is a block diagram of a contactless module which can be provided in a mobile terminal according to an embodiment of the invention.

FIG. 5 is a block diagram of the contactless module 20 in the mobile terminal 100 according to an embodiment of the invention.

Referring to FIG. 5, the contactless module 20 includes multiple antennas 21, 22 designated for the contactless communication, a multiplexer 24 for selectively receiving/transmitting signals via the antennas 21, 22 and processing the signals, a controller 26 for controlling all components of the contactless module 20, one or more storage units 28, and a secure element 32. The secure element 32 provides basically the same functions or operations as the secure element 60, in that the secure element 32 is for the contactless module 20 whereas the secure element 60 is for the mobile terminal 100. The contactless module 20 can store and access data (e.g., information, applications, etc.) to and from the storage device 40 of the mobile terminal 100. The contactless module 20 can include other components which are known.

The multiple antennas 21, 22 are preferably designated only for the contactless communication, e.g., for receiving and/or transmitting electromagnetic fields from and/or to the contactless module 220 of the external device 200. In the contactless module 20 of the mobile terminal 100, an N number of antennas 21, 22 can be provided where N is greater than 1 and is an integer. Although FIG. 5 shows two antennas at certain locations, it is only an example and other variations (e.g., different number and locations) are part of the invention. These antennas 21, 22 can be provided on different surfaces or faces of the mobile terminal 100. For example, two antennas can be provided on each of the surfaces of the mobile terminal 100 that are used often (e.g., two or more antennas on each of the front and back surfaces of the mobile terminal 100). These antennas can be disposed at locations in the mobile terminal 100 which can maximize the detection of RF fields and optimize the best signal reception.

The controller 26 can selectively activate or deactivate the multiplexer 24 which is used for antenna multiplexing. The controller 26 can initially activate the multiplexer 24 so that the signals from each of the multiple antennas 21, 22 can be selectively received at a time and processed. In this regard, the controller 26 can store information (e.g., signal detection level) on how well each of the antennas 21, 22 receives the signals and use this information to select the best antenna among the multiple antennas 21, 22 to exclusively send and receive signals (the current signals or subsequent signals) contactlessly. This information (e.g., signal strength detected by each of the antennas 21, 22) can be stored in the storage unit 28 or in other location. Generally the quality of the signal is usually better from the antenna that is closest to the contactless reader, but other factors may influence this detection (e.g., electromagnetic noise due to, e.g., battery or other parts of the mobile terminal). The controller 26 can send signals to an external device contactlessly using the antenna that was last used to receive the best signal. The controller 26 can also continuously, periodically, or at certain event monitor the quality of signals processed by each of the antennas, and switch to use one or more antennas among the multiple antennas to maximize the contactless signal detection. In another example, the controller 26 can use all the antennas 21, 22 simultaneously to send and receive signals contactlessly to external devices such as the device 200 so as to maximize the signal detection in contactless communication.

On the other hand, the controller 26 may deactivate the multiplexer 24 to minimize power consumption, whenever a signal detection from the antennas 21, 22 is at a certain power level indicating that there is no contactless transaction/communication. That is, if there is no contactless transaction, then the controller 26 can turn off the multiplexer 24.

Further, when there is contactless transaction that is active or whenever there is a reason to deactivate the multiplexer 24, the controller 26 may deactivate the multiplexer 24 to reduce power consumption (e.g., when using induced current in the mobile terminal 100) or for other reasons. In that case, the controller 26 can select the best antenna among the multiple antennas 21, 22 based on the signal strength detected by each of the antennas 21, 22 where this information can be prestored in the storage unit 28 as mentioned above, and use the selected antenna to send and receive signals contactlessly. In a variation, if the best antenna is somehow not available, a second best or another antenna among the multiple antennas 21, 22 can be selected and used by the controller 26. The controller further 26 can switch from using one antenna to another one if certain conditions change, e.g., if the signal strength level previously detected by one antenna is no longer applicable.

Figure 6:
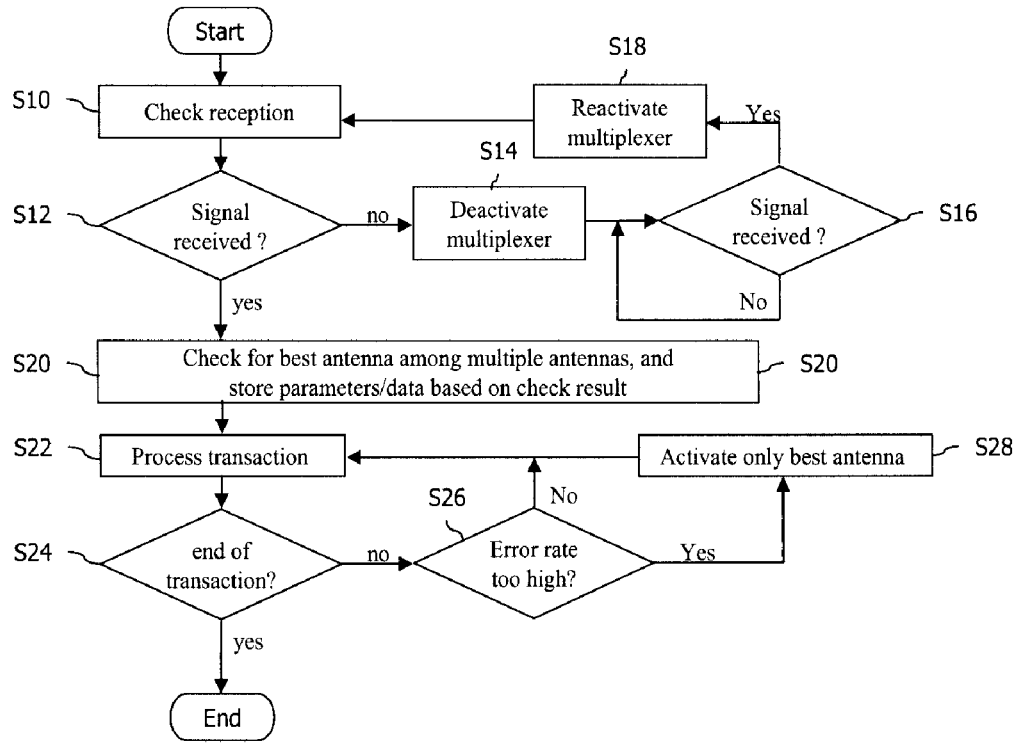
FIG. 6 is a flow chart illustrating a method of providing contactless communication using a mobile terminal according to an embodiment of the invention.

FIG. 6 is a flow chart illustrating a method of providing contactless communication using a mobile terminal according to an embodiment of the invention. The method of FIG. 6 is preferably applied in the devices of FIGS. 1-5. This method can, however, be applied to other devices capable of contactless communication.

Referring to FIG. 6, the controller 26 of the contactless module 20 checks if a signal has been received by the antennas 21, 22 at step S10. Here the multiplexer 24 is preferably turned on. If it is determined that the signal has been received at step S12, then the controller 26 checks and determines the best antenna among the multiple antennas 21, 22 designated for contactless communication at step S20. This can be done based on the signal strength detected by each of the antennas 21, 22. The controller 26 can store the determination result (e.g., information on the best antenna, signal strengths detected by each antenna, etc.) in the storage unit 28 or in other location.

Then the contactless transaction/communication is processed at step S22, e.g., using the multiplexer 24 and the antennas 21, 22. If the controller determines at step S24 that it is not the end of the contactless transaction/communication (e.g., during the contactless transaction), the controller checks at step S26 if the signals detected by the antennas 21, 22 have a high error rate (e.g., the signals detected by the antennas 21, 22 are below a certain threshold). If so, then the controller 26 selects and activates only the best antenna among the multiple antennas 21, 22 at step S28 and continues the contactless transaction using only the selected best antenna at step S22. Here the selection of the best antenna can be made based on the information/parameters stored at step S20, and/or based on the current signal strengths detected by the antennas 21, 22, and/or based on the movement of the mobile terminal 100 (to be discussed later). If at step S24 the end of the contactless transaction is detected, then the process ends.

On the other hand, at step S12 if it is determined that the signal is not received, then the controller 26 at step S14 deactivates or turns off the multiplexer 14 (e.g., to save power). Subsequently, if the controller 26 determines that a signal is received at the antennas 21, 22 at step S16, then the controller 26 reactivates the multiplexer 26 at step S18 and the method continues with step S10. In this way, the multiplexer 26 is activated only when it is needed.

Accordingly, the present invention provides multiple antennas designated for contactless communication in the mobile terminal and performs the contactless communication using the multiple antennas and the multiplexer. In another example, the contactless module of the mobile terminal can select the best antenna (at least one antenna) among the multiple antennas for use in the contactless communication based on the signal strengths detected by each of the multiple antennas. In addition to or in stead of the signal strength detected by each of the multiple antennas, the mobile terminal can use other information to select the best antenna among the multiple antennas. For example, the mobile terminal can use the movement of the mobile terminal, and this example will be discussed now referring to FIGS. 1 and 7.

Figure 7:
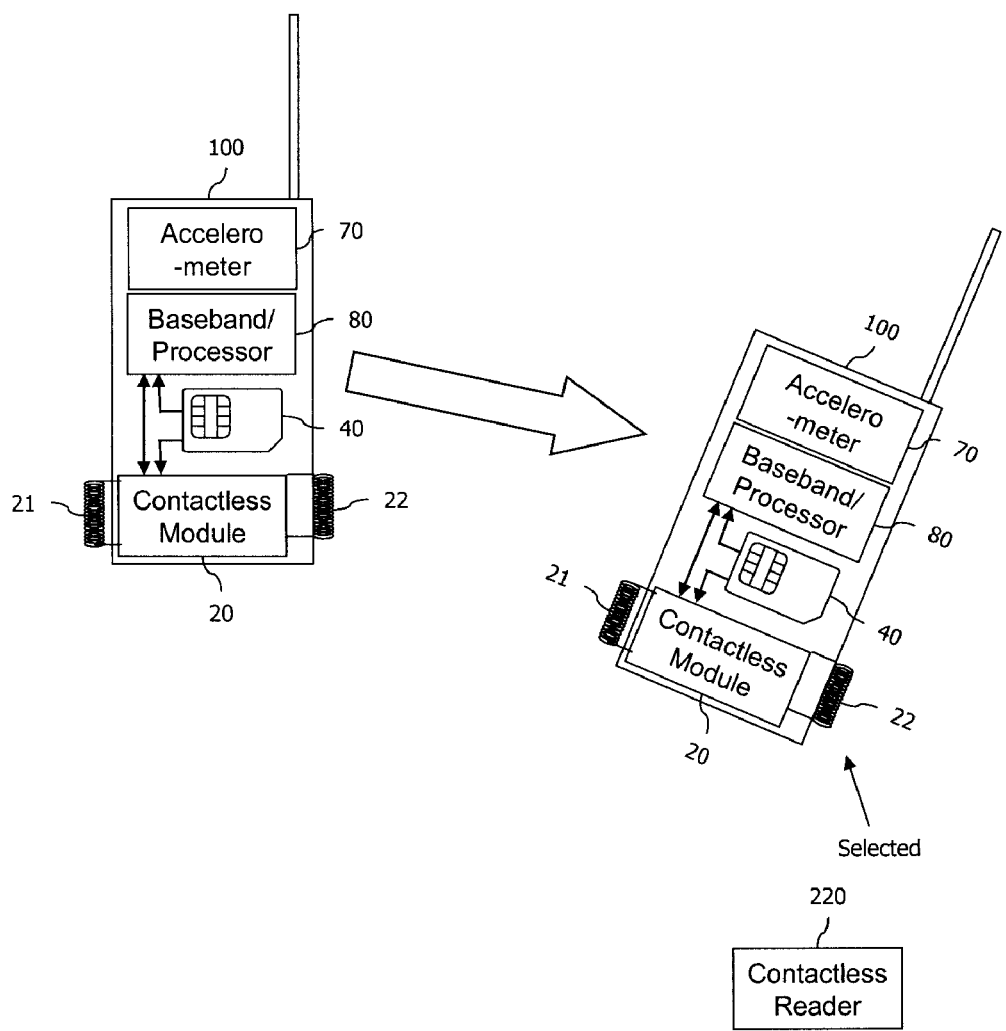
FIG. 7 is a diagram illustrating an example of a use of a mobile terminal having a contactless module and an accelerometer in contactless communication according to an embodiment of the invention.

As shown in FIGS. 1 and 7, the mobile terminal 100 can include the accelerometer 70 operatively coupled and configured to communicate with the a baseband or application processor 80 in the mobile terminal 100. Preferably the accelerator 70 is connected through the mobile chipset (e.g., either the baseband or the application processor 80 depending on the mobile terminal architecture) and this connection can be realized using I2C (Inter Integrated Circuit) or SPI (Serial Peripheral Interface) protocols connector of the contactless module 20. The baseband or application processor 80 can be part of the controller 10 or can be separate from the controller 10. The accelerometer 70 (or other suitable device) can detect the movement information of the mobile terminal 100, e.g., the tilting direction of the mobile terminal, which face is up, etc. Using this movement information, the controller 10 can decide which antenna among the multiple antennas 21, 22 would be the best antenna for the contactless communication, and select and use the best antenna (e.g., by switching from one antenna to another antenna) for the contact less communication.

To implement this, one can assume that the best antenna is most likely to be the one in the direction of the movement of the mobile terminal since the contactless reader (e.g., in the external device 200) is positioned generally in the direction of the last movement of the mobile terminal 100 and is likely to be positioned below the mobile terminal 100. For example, when a user presents the mobile terminal 100 in a front face up to a metro fare gate, then this movement/direction of the mobile terminal 100 can indicate that the best antenna would likely be the one that is located at a back side of the mobile terminal 100, e.g., since that back antenna would be located closest to the metro fare gate having the contactless reader. This assumption also covers most scenarios such as when a user presents a bag/purse having the mobile terminal 100 therein (without taking out the mobile terminal 100) near the contactless reader. If needed, different assumptions can be made to predetermine which antenna would be the best antenna when a specific movement of the mobile terminal is detected.

In the example of FIG. 7, when the mobile terminal 100 is presented to the contactless reader 220 of the external device 200 at a tilting angle as shown, this movement is detected by the accelerometer 70. Then this movement information is communicated to the controller 26 and the controller 26 determines that the right-side antenna 22 would be the best antenna among the antennas 21, 22 since, e.g., the right-side antenna 22 is likely to be closer to the reader 220 than the left-side antenna 21. the controller 26 selects and uses the right-side antenna 22 for the contactless communication with the reader 220. As a variation, the controller 26 can store in the storage unit 28 the association of the movement of the mobile terminal 100 with the best antenna based on the latest measurements (e.g., signal strengths), and update this information continuously, periodically or at certain events.

As mentioned above, the controller 26 can use the movement of the mobile terminal 100 and/or the signal strength detected by the antennas to select a most suitable antenna among the multiple antennas designated for contactless communication, and use the selected antenna only for the contactless communication. As a result, the present invention allows a selective and efficient use and management of multiple antennas for the contactless service in the mobile terminal, whereby the contactless signal detection is optimized.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for providing contactless communication in a mobile terminal, the mobile terminal including a plurality of antennas designated for a contactless reception/transmission of signals from/to an external device, a contactless module operatively coupled to the plurality of antennas, a controller and a multiplexer, the method performed by the controller and comprising:
receiving signals from the external device through the plurality of antennas;
checking strength of the signals received through each of the plurality of antennas;
selecting one of the plurality of antennas based on the strength of the signals using the multiplexer;
deactivating the multiplexer based on the strength of the signals; and
communicating with the external device through the selected antenna.

2. The method of claim 1, further comprising:
transmitting a signal to the external device using the selected antenna.

3. The method of claim 1, wherein the mobile terminal further comprises an accelerometer, and wherein the method further comprises:
determining, by the accelerometer, information on a movement of the mobile terminal; and
selecting, by the controller, the one of the plurality of antennas based on the information on the movement of the mobile terminal and the strength of the signals received through each of the antennas.

4. The method of claim 1, wherein the mobile terminal further comprises a removable storage device configured to store therein data, and wherein the method further comprises at least one of the following steps:
retrieving, by the contactless module, the data stored in the removable storage device for transmission to the external device; or
storing data received from the external device contactlessly in the removable storage device.

5. The method of claim 1, wherein the multiplexer is deactivated when the strength of the signals is less than a reference strength.

6. The method of claim 1, further comprising:
deactivating the multiplexer when the mobile terminal is in a battery off mode providing only limited services.

7. A mobile terminal comprising:
a plurality of antennas designated for a contactless reception/transmission of signals from/to an external device, each of the plurality of antennas configured to receive a signal provided from the external device;
a contactless module operatively coupled to the plurality of antennas;
a multiplexer for selectively multiplexing among the plurality of antennas; and
a controller which is configured to:
receive signals from the external device through the plurality of antennas;
check strength of the signals received through each of the plurality of antennas;
select one of the plurality of antennas based on the strength of the signals using the multiplexer;
deactivate the multiplexer based on the strength of the signals; and
communicate with the external device through the selected antenna.

8. The mobile terminal of claim 7, wherein the controller is further configured to transmit a signal to the external device using the selected antenna.

9. The mobile terminal of claim 7, further comprising:
an accelerometer configured to determine information on a movement of the mobile terminal,
wherein the controller is further configured to check the information on the movement of the mobile terminal, and select the one of the plurality of antennas based on the information on the movement of the mobile terminal and the strength of the signals received through each of the antennas.

10. The mobile terminal of claim 7, further comprising:
a removable storage device configured to store therein data,
wherein the contactless module retrieves the data stored in the removable storage device for transmission to the external device and/or stores data received from the external device contactlessly in the removable storage device.

11. The mobile terminal of claim 7, wherein the multiplexer is deactivated when the strength of the signals is less than a reference strength.

12. The mobile terminal of claim 7, wherein the controller is further configured to:

deactivate the multiplexer when the mobile terminal is in a battery off mode providing only limited services.

* * * * *